Dec. 10, 1968  D. A. WEUM  3,415,070
REFRIGERATION WARNING SYSTEM
Filed June 22, 1966  2 Sheets-Sheet 1

INVENTOR.
DALE A. WEUM
BY
Merchant & Gould
ATTORNEYS

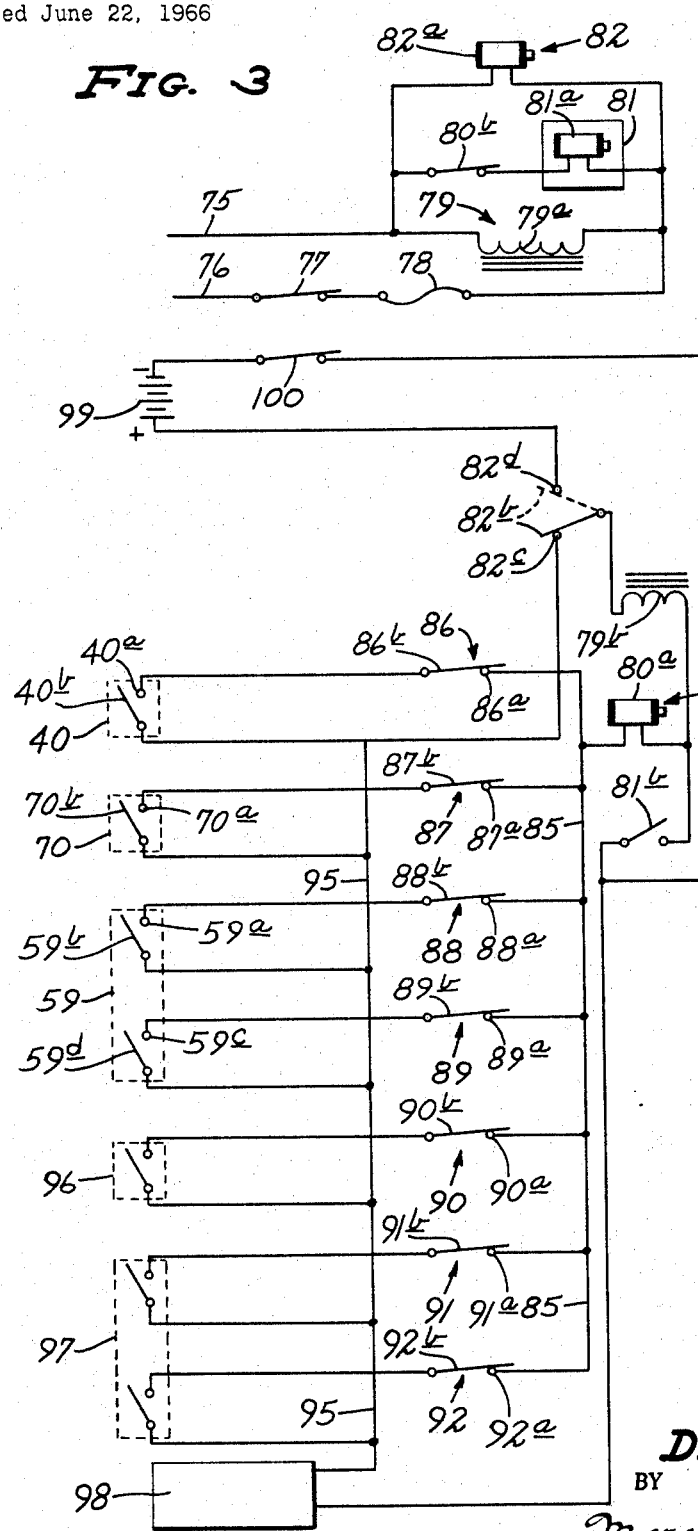

United States Patent Office 3,415,070
Patented Dec. 10, 1968

---

3,415,070
REFRIGERATION WARNING SYSTEM
Dale A. Weum, Minneapolis, Minn., assignor to Red Owl Stores, Inc., Hopkins, Minn., a corporation of Delaware
Filed June 22, 1966, Ser. No. 559,577
7 Claims. (Cl. 62—129)

ABSTRACT OF THE DISCLOSURE

A refrigeration malfunction warning system including a chamber formed by a jacket surrounding a refrigerant liquid header connected to receive a small amount of refrigerant liquid from the end of the header adjacent the condenser so that in the event the refrigerant liquid supply becomes low the chamber will be the first to receive an insufficient supply and will, therefore, increase in temperature. Electrical contacts associated with a temperature sensor in the chamber provide a remote signal of this occurrence. Electrical contacts associated with a pressure sensor in the header also provide a remote signal in the event of a loss of pressure or excess pressure in the header. In the event cool water is utilized in the condensers the warning system also includes pressure and temperature sensors in the water system to remotely indicate malfunctions therein.

---

The present invention pertains to a refrigeration warning system and more particularly to a system which provides a warning in advance of actual malfunctions in the refrigeration system so that shutdowns and the like may be prevented.

In refrigeration systems, especially relatively large refrigeration systems utilizing water cooled refrigerant condensers, extended shutdowns because of malfunctions within the system can become extremely expensive. Extended shutdowns can be especially expensive in large establishments that deal with frozen and chilled foodstuffs which will thaw out and spoil during such extended shutdowns and because of loss of customers while repairs are in progress. Once a malfunction occurs causing the refrigeration system to shutdown a large amount of time can be expended in finding the cause after which much more time is needed in the repair thereof and/or replacement of new parts, etc.

In the present invention a warning system is integrated into the refrigeration system to provide a warning in advance that a malfunction is about to occur. In general, the present warning system provides an operator with sufficient time before the malfunction occurs to either repair the difficulty without a shutdown of the refrigeration system or prepare for the repair of the refrigeration system with a minimum of shutdown time. Also, the present warning system provides indicators as to the general area containing the malfunction so that less time is expended in the search therefor. Because the operator is apprised of impending malfunctions the refrigeration system can be operated upon at the convenience of the establishment, for example after closing hours, etc. Thus, the present warning system is a great convenience for operators or repairmen of refrigeration systems and will save large establishments and the like substantial sums of money since impending malfunctions in the refrigeration system can be repaired without the closing thereof and, in many cases, without having an actual shutdown of the refrigeration system.

It is an object of the present invention to provide a warning system for refrigeration systems.

It is a further object of the present invention to provide a warning system for refrigeration systems which will provide an indication of impending malfunctions in the refrigeration system as well as the general area of the malfunction.

These and other objects of this invention will become apparent to those skilled in the art upon consideration of the accompanying specification, claims, and drawings.

Referring to the drawings, wherein like characters indicate like parts throughout the figures:

FIG. 3 is a schematic diagram of the electrical circuitry contained in the present invention.

Figure 1:
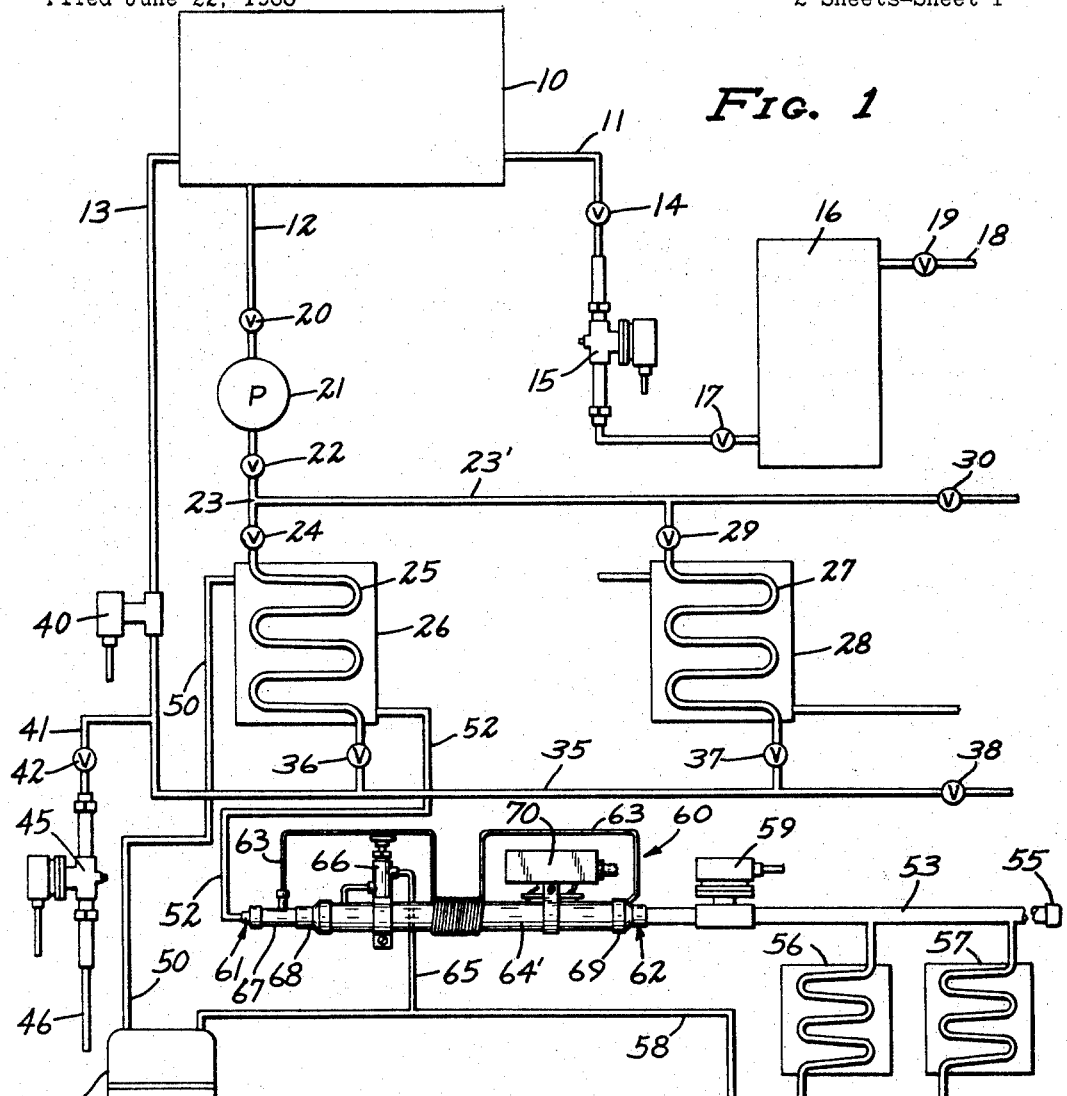
FIG. 1 is a somewhat schematic view of a refrigeration system containing the present invention.

Referring to FIG. 1 the numeral 10 indicates a water tank, which may be a water tower or any other device having means therein for evaporating water to maintain a supply of water at a given temperature. No detailed illustrations of the tank 10 are included because it does not form a part of this invention and is simply illustrated so that an entire water circulating system may be shown. The tank 10 has three water conveying conduits 11, 12 and 13 operatively attached thereto. Conduit 11 extends from the tank 10 to a valve 14 and from the valve 14 to a water flow regulating device designated 15. The water flow regulating device 15 will not be discussed in detail since it does not form a part of this invention and it should be understood that it could be any variable device for regulating the flow of water through the conduit 11. The conduit 11 extends from the regulating device 15 to the outlet of a water treatment tank 16 and has a second valve 17 interposed therebetween. A conduit 18 leading from a source of fresh water is attached to the inlet of the water treatment tank 16 and has a valve 19 therein. The valves 14, 17 and 19 will not be discussed in detail since they are simply utilized to close off the flow of water during maintenance of the system. Thus, water flows from the supply through the conduit 18, the water treatment tank 16 and the conduit 11, including the regulating device 15, into the tank 10.

The conduit 12 operatively attached to the tank 10 has a valve 20 interposed therein and is connected to the inlet of a pump 21. The outlet of the pump 21 is connected through a valve 22 to one branch of a T-junction 23. The other branch of the T-junction 23 is connected through a valve 24 to the inlet of a cooling coil 25 disposed in a refrigerant condenser 26. The body of the T-junction 23 is attached to, or forms a part of, a header 23' which may extend as far as desirable and generally terminates, not shown, by simply capping the end or by connecting the end to a cooling coil similar to 25. The inlet of a second cooling coil 27 disposed in a refrigerant condenser 28 is attached to the header 23' through a valve 29 simply to illustrate the manner in which a plurality of cooling coils are attached to the header 23'. A valve 30 is disposed in the header 23' for maintenance purposes.

The outlets of the cooling coils 25 and 27 are attached to a return line 35 through valves 36 and 37 respectively. The end of the return line 35 is not illustrated to indicate that the line may be as long as desirable, however, a valve 38 is interposed therein for maintenance purposes. The return line 35 is connected to the inlet of a thermostat 40. The conduit 13 operatively attached to the tank 10 is connected to the outlet of the thermostat 40. A conduit 41 is connected into the return line 35, by means of a T-junction or the like, between the outlet of the cooling coil 25 and the thermostat 40. The conduit 41 has a valve 42 interposed therein and is operatively attached to the inlet of a regulating device 45. Regulating device 45 may be a device similar to the regulating device 15 and will not be described further. The outlet of the regulating device 45 is connected through a conduit 46 to a drain, not shown. It should be understood that the above described water system is not a necessity to the present invention and, while a refrigeration system not utilizing a water circulating system therein may contain the present invention, this invention was designed with the larger refrigeration systems utilizing water circulating systems therein in mind.

In the operation of the water circulating system the tank 10 maintains a supply of water approximately at a predetermined temperature by means of evaporation or the like. This supply of water is circulated by pump 21 into the header 23' and from there through the cooling coils 25, 27, etc. to the return line 35. The water in the return line 35 is forced through the thermostat 40 and the conduit 13 back into the tank 10 where it is recooled. At this point the thermostat 40 provides an indication as to the overall operation of the water circulating system. In the event that the water passing through the thermostat 40 is at too high a temperature, because of difficulties in the tank 10 or elsewhere in the system, electrical contacts within the thermostat 40 operate. These electrical contacts are connected into a central warning system, which will be described presently, and when the contacts operate an indicating device is energized. It should be understood that the thermostat 40 could also provide an indication when the water passing therethrough is below a desired temperature, which could indicate freezing in the tank 10 (during the winter time) or malfunctioning condensers 26 and/or 28.

Because water is constantly evaporating from the tank 10 to maintain the water therein at a predetermined temperature, minerals and foreign materials, which will not evaporate, accumulate in the tank 10 until they hamper and even prevent the circulation of the water through the circulating system. To prevent this large accumulation of foreign materials the conduit 41, regulating device 45 and conduit 46 provide a path to a drain or the like through which a predetermined amount of water can flow. This flow or bleed off of water to the drain carries with it a sufficient amount of the impurities to prevent them from accumulating to a quantity which would be harmful to the system. As the water level in the tank 10 is lowered through evaporation and the bleed off of impurities to the drain, the water is replenished from a source through the conduit 18, water treatment tank 16 and the conduit 11, which contains the regulating device 15. Thus, water is constantly circulated through the cooling coils 25, 27, etc. to operate the condensers in the refrigeration system.

A typical refrigeration system, which may be attached to the above described water circulating system, is connected as follows. The refrigerant inlet of the condenser 26 is operatively attached to a conduit 50 the other end of which is attached to the outlet of a compressor 51. The refrigerant outlet of the condenser 26 is operatively attached to a conduit 52 the other end of which is attached to a refrigerant header or main conduit 53 through a low refrigerant indicator 60. The low refrigerant indicator 60 will be explained in detail presently. The refrigerant header 53 is capped at the far end 55 and has the inlets for the cooling coils of a plurality of refrigeration units 56, 57, etc. operatively attached thereto, by some means such as T-joints or the like. The outlets of the cooling coils in the refrigeration units 56, 57, etc. are operatively attached to a return line 58 by some means such as T-joints or the like. The return line 58 may terminate, not shown, in the outlet of a refrigeration unit or it may simply be capped in a manner similar to the header 53. The other end of the return line 58 is operatively attached to the inlet of the compressor 51. It should be understood that the refrigeration system described is simply for illustratively purposes and is not intended to limit the scope of this invention in any way.

A pressure responsive device 59 is mounted in the header 53 so that the liquid regrigerant flowing in the header 53 acts thereon. The pressure responsive device 59 may be of any type having a plurality of electrical contacts associated therewith which operate when the pressure of the liquid refrigerant in the header 53 exceeds a predetermined range. The pressure responsive device 59 may be two devices consisting of a high pressure sensor and a low pressure sensor or it may be embodied in a single device as illustrated. Operation of either the high pressure or low pressure contacts in the pressure responsive device 59 may indicate a variety of malfunctions, including a faulty compressor, a leak in the refrigeration system, etc. By setting at a relatively close tolerance the range within which the contacts of the pressure responsive device 59 will operate malfunctions can be detected in the system before they are serious enough to cause a shutdown of the system. Early warning of a malfunction will allow detection and repair with a minimum of shutdown time.

The conduit 52 is attached to a liquid refrigerant inlet 61 at one end of the low refrigerant indicator 60. The other end of the indicator 60 constitutes a liquid refrigerant outlet 62 and is attached directly to the header 53. A capillary tube 63 is connected in communication with the liquid refrigerant inlet 61 and an evaporator chamber 64 and serves to introduce a small amount of refrigerant liquid into the chamber 64 when the refrigerant liquid in header 53 is at the correct level. One end of a conduit 65 is connected in communication with the chamber 64 and the other end is connected, through a manual shut off valve 66, to the gas return line 58. The evaporator chamber 64 and the apparatus and manner of connecting it into the refrigeration system constitutes a low refrigerant indicating device which operates in the following manner. When the amount of refrigerant liquid supplied by the condenser 26 to the header 53 is insufficient to fulfill the requirements of the cooling units 56, 57, etc. the first branch line from the header 53 to receive an insufficient amount of refrigerant liquid is the line immediately adjacent the outlet of the condenser 26. As the refrigerant liquid in the header 53 decreases in volume the conduit immediately adjacent the outlet of the condenser 26, which in this case is the capillary tube 63, is the first to receive an insufficient supply of refrigerant liquid and as the amount of refrigerant liquid decreases further the next conduit in the header 53, which in this embodiment is the inlet of the cooling unit 56, begins to receive an insufficient amount of refrigerant liquid. Therefore, an insufficient amount of liquid supplied to the evaporator chamber 64 is an indication that the amount of liquid in the header 53 is decreasing and that there is some difficulty in the refrigeration system. In this particular embodiment the capillary tube 63 is connected to the inlet 61 at the top or upper surface thereof so that it receives an insufficient amount of refrigerant liquid whenever the header 53 is not full. While the low refrigerant indicator 60 would operate if the capillary tube 63 were connected at the bottom of the inlet 61, the level of liquid in the header 53 would be much lower before an insufficient amount of liquid was supplied thereto and an operator would not be warned at the earliest possible time. Also, it should be understood that the inlet of the capillary tube 63 can be connected anywhere between the outlet of the condenser 26 and the first branch line or refrigeration unit 56.

Figure 2:
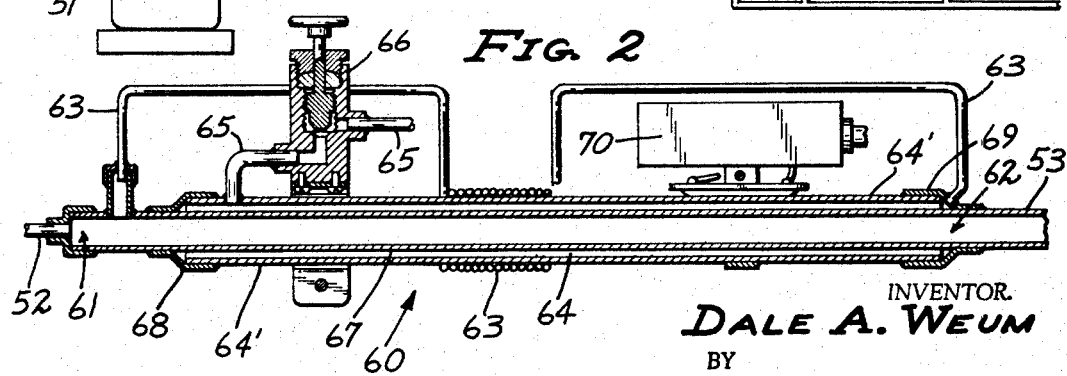
FIG. 2 is an enlarged axial cross-sectional view of a low refrigerant indicating device.

The low refrigerant indicator 60 is illustrated in detail in FIG. 2. The indicator 60 includes a hollow cylindrical body 67 having an inner diameter substantially equal to the inner diameter of the header 53 and in fact if it is convenient may be an extension of the header 53. The left end of the body 67 serves as the refrigerant liquid inlet 61 and has a liquid tight cap thereon with a centrally located opening in which the end of the conduit 52 is fixedly attached. The right end of the body 67 serves as the refrigerant liquid outlet 62 and is attached coaxially to the end of the header 53 by some means such as brazing, welding, threading, etc. The evaporator chamber 64 is formed around the body 67 by a concentric hollow cylinder 64' having an inner diameter somewhat larger than the outer diameter of the body 67. Each of two cylindrical end caps 68 and 69 have an axial opening at one end with a diameter approximately equal to the outside diameter of the body 67 and an axial opening at the other end with a diameter approximately equal to the outside diameter of the cylinder 64'. The end caps 68 and 69 are placed over the body 67 and either end of the cylinder 64' and securely fixed in place by brazing, welding, etc. to hold the cylinder 64' in place and form the fluid tight chamber 64.

One end of the capillary tube 63 is attached to the body 67 adjacent the liquid input 61 at the top or upper surface thereof and the other end is connected to the chamber 64 through an opening in the cap 69. Thus, when the body 67 is substantially full of refrigerant liquid some liquid will flow through the capillary tube 63 into the chamber 64. The amount of fluid flowing into the chamber 64 is dependent upon the diameter and the length of the capillary tube 63 and in the present embodiment the excess length is wound around the outer surface of the cylinder 64' to maintain it free from interference. One end of the conduit 65 is in communication with the chamber 64 through an opening in the cylinder 64' adjacent the cap 68 and approximately in the upper surface thereof and the other end is operatively attached to the return line 58. The manual valve 66 disposed in the conduit 65 serves to close the conduit 65 when desired and, thus, close or discontinue operation of the entire low refrigerant indicator 60.

The present embodiment of the low refrigerant indicator 60 is utilized for efficiency. Since substantially all of the refrigerant liquid flows through the body 67 in the center of the chamber 64 the liquid is precooled before leaving the indicator 60 and, thus, the liquid utilized in the chamber 64 serves two purposes. Also, all of the refrigerant liquid flowing through the body 67 is utilized to warm the chamber 64 when the amount of liquid entering the chamber 64 is reduced because of an impending failure. If the chamber 64 does not have some means of warming it when the liquid flow is reduced the chamber 64 may remain cool for an extended period of time, due to ice accumulation thereon, etc., and there will not be an advance indication of the failure. It should be understood that the present embodiment, wherein the refrigerant fluid flowing in the header 58 serves as a heat exchanger for the low refrigerant indicator 60, is utilized for efficiency but other embodiments in which the chamber 64 is warmed by some means such as a fan, etc. might be utilized.

As the refrigerant liquid evaporates in the chamber 64 the entire chamber 64 including the outer surface of the cylinder 64' is cooled a predetermined amount, depending upon the amount of refrigerant liquid therein. Thus, when the capillary tube 63 is supplying an insufficient amount of refrigerant liquid to the chamber 64 the temperature therein will rise. To detect such a rise a temperature sensor 70 is positioned adjacent the chamber 64. The pressure responsive device 70 is the type that contains a liquid in a sealed tube which is in communication with a pressure responsive device at one end. A portion of the sealed tube is adjacent the cylinder 64' and is at approximately the same temperature. As the temperature of the cylinder 64' goes up the liquid in the sealed tube expands and closes a pair of contacts 70a and 70b (illustrated in FIG. 3). It should be understood that the temperature sensor could be the type which completes an external electrical circuit when mercury or other conducting liquid therein expands to encompass a pair of contacts extending into the fluid chamber or it could be a simple bimetal switch. There are also several other types of temperature indicators which might be utilized in or adjacent the evaporator chamber 64 and will provide an indication of a temperature change therein.

Referring to FIG. 3 the present warning system is attached to a suitable source of power, such as 115 volts AC by a pair of leads 75 and 76. A manual power switch 77, a suitable fuse 78 and the primary winding 79a of a power transformer 79 are connected in series between the leads 75 and 76. A pair of contacts 80b, which are operated by the energization of a coil 80a of an alarm relay 80, are connected in series with the leads to a coil 81a in a time delay clock 81. The time delay clock 81 has a set of contacts 81b associated therewith which are operated a predetermined period of time after the energization of the coil 81a. The series connection of the contacts 80b and the coil 81a is connected in parallel across the primary winding 79a of the transformer 79. A coil 82a in a power failure relay 82, which when energized operates a movable contact 82b to move from a stationary contact 82c to a contact 82d, is also connected in parallel across the primary winding 79a of the transformer 79.

One side of a secondary winding 79b of the transformer 79 is connected to the movable contact 82b of the power failure relay 82. The other side of the secondary winding 79b is connected to one side of the coil 80a of the alarm relay 80 and to one of the contacts 81b of the time delay clock 81. The other side of the relay coil 80a is connected to a lead 85 which is connected to stationary contacts 86a–92a of manual test switches 86–92, respectively. A movable contact 86b of the manual test switch 86 is connected to a stationary contact 40a of the set of contacts in the thermostat 40. A movable contact 40b of the thermostat 40 is connected to the stationary contact 82c of the power failure relay 82. A movable contact 87b of the manual test switch 87 is connected to a stationary contact 70a of the contacts in the temperature responsive device 70. A movable contact 70b of the temperature responsive device 70 is connected to a line 95. A movable contact 88b of the manual test switch 88 is connected to a stationary contact 59a of the pressure responsive device 59. A movable contact 59b associated with the stationary contact 59a in the pressure responsive device 59 is connected to the line 95. The contacts 59a and 59b operate when the pressure responsive device 59 senses a pressure below the lower pressure in the desirable range. A movable contact 89b in the manual test switch 89 is attached to a stationary contact 59c in the pressure responsive device 59. A movable contact 59d associated with the movable contact 59c is attached to the line 95. The contacts 59c and 59d operate when the pressure responsive device 59 senses a pressure above the highest pressure in the desirable range. Additional sets of contacts associated with devices 96 and 97 are connected electrically into the circuit in a manner similar to the sets of contacts associated with devices 70 and 59 to illustrate the connection of a second refrigeration system, not shown but mechanically attached to the condenser 28, in the electrical circuitry. The lead 95 is connected to one side of an indicator 98 the other side of which is connected to the contacts 81b of the time delay clock 81.

In the event of a power failure an auxiliary power source, which may be for example batteries 99 or the like, is automatically switched into the circuit. The batteries 99 have a manual power switch 100 connected in series therewith and the opposite side of the batteries 99 is connected to the stationary contact 82d of the power failure relay 82. The opposite side of the manual power switch 100 is connected between the indicator 98 and the contacts 81b. Thus, with a loss of power on the leads 75 and 76 the power failure relay coil 82a is deenergized allowing the movable contact 82b to move from the stationary contact 82c to the stationary contact 82d. Also, since the coil 81a of the time delay clock 81 is not energized the contacts 81b are open. Thus, when power is removed from the lead 75 and 76 a circuit is completed from one side of the auxiliary power source 99 through switch contacts 82d and 82b, power transformer primary winding 79b and alarm relay coil 80a to the line 85. The other side of the auxiliary power source 99 is connected through the manual switch 100 and the indicator 98 to the line 95. Each of the switches 86 through 92 is normally closed and the closure of any of the sets of contacts, 40a–40b, 70a–70b, 59a–59b, 59c–59d, etc., will complete a circuit from the auxiliary power source 99 to the indicator 98, thus, energizing the indicator 98.

When the appropriate power is applied to lead 75 and 76 power failure relay coil 82a is energized and movable contact 82b moves into engagement with the stationary contact 82c. Also, voltage is applied to the primary winding 79a of transformer 79 which causes a somewhat stepdown voltage to be induced into the secondary winding 79b. One side of the secondary winding 79b is attached through contacts 82b and 82c to the line 95 while the other side is connected to the line 85 through the alarm relay coil 80a. Thus, when one of the sets of contacts 40a–40b, 70a–70b, 59a–59b, 59c–59d, etc. is closed because of a malfunction in the refrigeration or water circulating systems a circuit is completed from the secondary winding 79b through the alarm relay coil 80a. Energization of the relay coil 80a closes the contacts 80b, thereby, applying voltage to the time delay relay coil 81a in the time delay clock 81. After a predetermined period of time has elapsed the contacts 81b close and one side of the secondary winding 79b is connected directly to one side of the indicator 98 through the contacts 81b while the other side of the secondary winding 79b is connected directly to the other side of the indicator through the contacts 82b and 82c. Thus, a predetermined period of time after a characteristic change indicating an impending malfunction occurs in the refrigeration or water circulating systems the indicator 98 is energized.

The time delay clock 81 is the type which continues to run only as long as energization is applied thereto. If for some reason the characteristic change in the refrigeration or water circulating system is rectified before the contacts 81b close, the set of contacts, 40a–40b, 70a–70b, 59a–59b, 59c–59d, etc., which have closed because of the characteristic change, opens removing power from the alarm relay coil 80a which in turn opens the contacts 80b and removes power from the time delay clock. Thus, the time delay clock 81 returns to zero and is not again energized until another characteristic change or malfunction occurs. This delay is designed into the alarm system so that it is not affected by temporary characteristic changes in the system or malfunctions, such as large particles in the water circulating system which eventually break up or abnormally large variations in temperature or pressure of the refrigeration system which are caused by outside conditions rather than malfunctions.

Each of the switches 86–92 may be a push button or a toggle switch or any type which can be easily operated manually to open the circuit momentarily and remain in the normally closed position at all other times. Each of the switches 86–92 is in series with a set of contacts the closure of which is caused by a characteristic change in the refrigeration or water circulating system indicating a particular impending malfunction therein. All of the switches 86–92 should be mounted on a centrally located control board adjacent the indicator 98. Thus, when the indicator 98 is energized an operator can rapidly operate each of the switches 86–92 in sequence to determine exactly what the characteristic change is and where it has occurred. For example, if the operator operates switch 86 and the indicator 98 is de-energized the operator immediately knows that the contacts 40a and 40b have operated. Thus, the operator would know that the water passing through thermostat 40 is too warm. In a like manner if the operator discovers that contacts 70a and 70b have operated, by operating the switch 87, he would know that the header 53 has a low supply of refrigerant therein. Similarly switches 88 and 89 will provide the operator with an indication of low pressure or high pressure, respectively, in the header 53. The operator can receive the same information from switches 90–92 with reference to the second refrigeration system as he can from the switches 87–89 with reference to the illustrated refrigeration system.

Thus, the present warning system provides an operator with an indication of impending malfunctions. In addition, the present warning system indicates to the operator the general area where the malfunction will occur as well as some general information as to what the malfunction might be. Also, the present warning system operates on auxiliary power when malfunctions occur in the main power source or within the warning system. In addition, the present warning system is not affected by temporary characteristic changes in the system, which rectify themselves within a given period of time and do not indicate impending malfunctions.

While I have shown and described a specific embodiment of this invention, further modifications and improvements will occur to those skilled in the art. I desire it to be understood therefore, that this invention is not limited to the particular form shown and I intend in the appended claims to cover all modifications which do not depart from the spirit and scope of this invention.

What is claimed is:

1. In a refrigeration system including a condenser having at least one cooling unit attached thereto by a header and a refrigerant gas return line, a low refrigerant indicating device having a fast reaction time comprising:
    (a) an evaporator chamber having an inlet and an outlet and having a volume which is small relative to the cooling unit;
    (b) said inlet of said evaporator chamber being in communication with the header in the refrigeration system between the condenser and the first cooling unit attached to the header, and said outlet of said evaporator chamber being operatively connected to the return line;
    (c) a temperature indicating device associated with said evaporator chamber for indicating a rise in temperature within the evaporator chamber above a predetermined temperature; and
    (d) means associated with the evaporator chamber for relatively quickly raising the temperature of said chamber above the predetermined temperature when the condenser is supplying an insufficient amount of refrigerant fluid to said evaporator chamber.

2. A low refrigerant indicating device in a refrigeration system as set forth in claim 1 wherein the refrigerant fluid in the evaporator chamber is utilized to precool the remainder of the refrigerant fluid flowing into the header.

3. A low refrigerant indicating device in a refrigeration system as set forth in claim 1 wherein the means for relatively quickly raising the temperature of said chamber includes a conduit conveying substantially all refrigerant liquid to the header through said indicating device so that the refrigerant liquid serves as a heat exchanger for warming the evaporator chamber upon the reduction of the amount of liquid supplied to said evaporator chamber.

4. A low refrigerant indicating device in a refrigeration system as set forth in claim 1 wherein the cooling unit is attached to the condenser by a conduit having at least a horizontal portion and the inlet of the evaporator chamber is operatively connected to said conduit at the upper part of the horizontal portion.

5. In a refrigeration system including a condenser, a header attached to said condenser for receiving the refrigerant liquid therefrom and having at least one cooling unit attached thereto and a refrigerant gas return line, a warning system comprising:

(a) a low refrigerant indicating device including an evaporator chamber having an inlet and an outlet, said inlet of said evaporator chamber being operatively connected to the header in the refrigeration system between the connection of the condenser to the header and the connection of the cooling unit to the header and said outlet of said evaporator chamber being operatively connected to the return line, and a temperature sensing device associated with said evaporator chamber having a set of electrical contacts which operate when the temperature in the evaporator chamber rises above a predetermined value;

(b) a pressure sensor associated with the header having electrical contacts connected thereto which operate when the pressure exceeds a predetermined range; and (c) indicating means and electrical circuitry connecting said electrical contacts of said temperature sensing device and said pressure sensor between a suitable source of power and said indicating means for providing an indication when said contacts operate.

6. A warning system in a refrigeration system substantially as set forth in claim 5 wherein the condenser is cooled by circulating water having in addition a water temperature sensor with electrical contacts adapted to operate when the circulating water rises above a predetermined value, said contacts being operatively connected to the indicating means for providing an indication when said contacts operate.

7. A warning system in a refrigeration system substantially as set forth in claim 5 wherein the indicating means and electrical circuitry includes a time delay for providing a relatively short period between the closing of the electrical contacts and the energization of the indicating means during which period temporary variations in the refrigeration system may occur without energizing the indicating means.

References Cited

UNITED STATES PATENTS

| 2,402,802 | 6/1946 | Carter | 62—513 |
| 3,150,498 | 9/1964 | Blake | 62—81 |
| 3,177,674 | 4/1965 | Spofford | 62—129 |
| 3,234,749 | 2/1966 | Quick | 62—129 |

ROBERT A. O'LEARY, *Primary Examiner.*

U.S. Cl. X.R.

62—513